United States Patent [19]
Fennel et al.

[11] Patent Number: 5,795,039
[45] Date of Patent: Aug. 18, 1998

[54] BRAKE SYSTEM WHICH MAINTAINS BRAKE FORCE DISTRIBUTION UPON SYSTEM MALFUNCTION WHILE PARTIALLY DISABLING ANTI-LOCK AND TRACTION SLIP

[75] Inventors: Helmut Fennel, Bad Soden; Norbert Ehmer, Eschborn; Alexander Kolbe, Gross-Zimmern; Robert Schmidt, Rennerod; Thomas Proger, Rödermark. all of Germany

[73] Assignee: ITT Automotive Europe GmbH, Germany

[21] Appl. No.: 732,399

[22] PCT Filed: Apr. 19, 1995

[86] PCT No.: PCT/EP95/01467

§ 371 Date: Jan. 14, 1997

§ 102(e) Date: Jan. 14, 1997

[87] PCT Pub. No.: WO95/29829

PCT Pub. Date: Nov. 9, 1995

[30] Foreign Application Priority Data

Apr. 29, 1994 [DE] Germany ............... 44 14 980.8

[51] Int. Cl.⁶ ................... B60T 8/04; B60T 8/00
[52] U.S. Cl. ................... 303/122.05; 303/122.12
[58] Field of Search .................. 303/122, 122.01, 303/122.02, 122.04, 122.05, 122.06, 122.07, 122.12, 191, 194, 195, 196

[56] References Cited

U.S. PATENT DOCUMENTS

| | | |
|---|---|---|
| 4,005,911 | 2/1977 | Klatt et al. . |
| 4,523,791 | 6/1985 | Belart et al. . |
| 4,648,662 | 3/1987 | Fennel et al. . |
| 4,699,436 | 10/1987 | Klein . |
| 4,831,826 | 5/1989 | Belart et al. . |
| 4,841,446 | 6/1989 | Leiber et al. ............. 303/122.06 |
| 4,876,527 | 10/1989 | Oka et al. ............. 303/122.06 |
| 5,001,641 | 3/1991 | Makino ............. 303/122.07 |
| 5,236,254 | 8/1993 | Muller et al. ............. 303/122.02 |
| 5,495,343 | 2/1996 | Lindenman et al. ............. 303/122.12 |
| 5,526,264 | 6/1996 | Niggemann et al. ............. 303/122.05 |
| 5,558,415 | 9/1996 | Buschmann et al. . |

FOREIGN PATENT DOCUMENTS

| | | |
|---|---|---|
| 2 253 867 | 5/1974 | Germany . |
| 2 712 693 | 9/1978 | Germany . |
| 2 722 435 | 11/1978 | Germany . |
| 3 136 944 | 3/1983 | Germany . |

(List continued on next page.)

*Primary Examiner*—Matthew C. Graham
*Attorney, Agent, or Firm*—Thomas N. Twomey; J. Gordon Lewis

[57] ABSTRACT

A circuit for a brake system with pressure fluid distribution, anti-lock control, and traction slip control. The circuit includes circuits to monitor the brake system and to change over or disconnect the control in response to defects and/or the respective control situation or driving situation. Upon failure of any one of the sensors which sense wheel rotation behavior or one sensor per axle or in the presence of an incorrect sensor signal, the vehicle reference speed is produced on basis of the intact sensors, and an electronic brake force distribution control function is still possible, however, an anti-lock control or a traction slip control is prevented. When the defective sensor is a rear-wheel sensor, both rear wheels are controlled synchronously. Upon the occurrence of a defect or a malfunction of a hydraulic pump system or when the supply voltage drops, an electronic brake force distribution control function is possible until a defined limit value, however, an anti-lock control/traction slip control is prevented.

9 Claims, 2 Drawing Sheets

FOREIGN PATENT DOCUMENTS

| | | |
|---|---|---|
| 3 232 051 | 3/1984 | Germany. |
| 3 323 402 | 10/1984 | Germany. |
| 3 324 631 | 1/1985 | Germany. |
| 3 417 019 | 11/1985 | Germany. |
| 3 644 139 | 7/1988 | Germany. |
| 3 841 958 | 6/1990 | Germany. |
| 3 925 829 | 2/1991 | Germany. |
| 3 941 409 | 4/1991 | Germany. |
| 4 037 175 | 6/1991 | Germany. |
| 4 106 704 | 9/1992 | Germany. |
| 4 137 124 | 5/1993 | Germany. |
| 4 203 671 | 8/1993 | Germany. |
| 4 212 337 | 10/1993 | Germany. |
| 4 224 971 | 2/1994 | Germany. |
| 4 226 646 | 2/1994 | Germany. |
| 2 158 533 | 11/1985 | United Kingdom. |
| 93/12960 | 7/1993 | WIPO. |

BRAKE SYSTEM WHICH MAINTAINS BRAKE FORCE DISTRIBUTION UPON SYSTEM MALFUNCTION WHILE PARTIALLY DISABLING ANTI-LOCK AND TRACTION SLIP

This application is the U.S. national-phase application of PCT International Application No. PCT/EP95/01467.

FIELD OF THE INVENTION

The present invention relates to a circuit for a brake system with electronic control of the brake force distribution to the wheel brakes of the front and rear axles, hereinbelow referred to as EBV, and with electronic anti-lock control and/or traction slip control systems, hereinbelow referred to as ABS and/or TCS. This circuit includes (a) electrically controllable hydraulic valves in the pressure fluid conduits leading to the wheel brakes and in the return conduits, by which pressure fluid is discharged in the pressure reduction periods, (b) wheel sensors to determine the rotational behavior of the individual wheels, (c) electric circuits to evaluate the sensor signals to produce a vehicle reference speed and to generate the braking-pressure control signals or valve control signals, and (d) circuits to monitor the brake system and to partially or completely disconnect or change the control over in response to defects or malfunctions and/or in response to the respective control situation or driving situation.

German Patent No. 33 23 402 discloses an anti-lock brake system including electrically operable hydraulic valves which are used for anti-lock control and for the control of the brake force distribution to the front axle and the rear axle for an adaption to the static and dynamic load of the vehicle axles. The data about the rotational behavior of the individual wheels, produced by wheel sensors, are evaluated for the electronic control of the brake force distribution in partial braking operations, (i.e. in the absence of anti-lock control). The brake slip of the rear wheels is limited to a defined value or percentage of the brake slip on the front wheels by operation of the rear-wheel hydraulic valves. Because the hydraulic valves in the connecting lines of the rear-wheel brakes and the wheel sensors and the electric circuits for evaluating the sensor signals are already required for anti-lock control operations, only very limited additional structure is needed for the extension to the electronic brake force distribution control system. However, it should be ensured that overbraking of the rear wheels is prevented even upon failure of the current supply or malfunction of the electronic control. Typically, a conventional mechanical or hydraulic braking-pressure reducing valve or brake force control valve is additionally required for safety reasons in spite of the electronic control of the brake force distribution.

A number of suggestions and measures are known to monitor the electronic and hydraulic components of electronically controlled brake systems. In general, the objective of these monitoring operations is to disconnect the control immediately, or after termination of the instantaneous control operation or the jeopardized control situation, upon the occurrence of defects or malfunctions to ensure at least the conventional, (i.e. the uncontrolled), function of the brake system. For example, German published Patent Application No. 27 12 693 discloses measures to monitor the wheel sensors of an anti-lock control system (ABS). In this publication, the dependency of the control on the spurious signal is eliminated after the disturbance of a wheel sensor has been detected. Instead, anti-lock control is taken over by the intact wheel sensor and the associated control channel. Further, the pressure reduction periods and the pressure maintaining periods for both wheel brakes are extended in this case of error. The development of great yawing torques, which are caused by locking of a wheel or by an unpressurized wheel brake, are prevented by changing from the individual control to the parallel control of the braking pressure.

German Patent Application No. 40 37 175 discloses an anti-lock brake system including a failure-signaling circuit. A connection by way of a main relay and, in parallel thereto, by way of a decoupling diode and a warning lamp, which permits only a limited amount of current, is provided for the current supply to the electrically operable hydraulic valves. The function of the individual hydraulic valves is monitored by single test pulses which are generated by feedback. To identify failure of the main relay, all valves are simultaneously actuated by test pulses which causes a sag of the supply voltage introduced by way of the warning lamp if the current supply through the main relay is interrupted. This voltage sag is evaluated for error detection.

In addition, it is known to regularly test the reaction of the front wheels to the braking pressure in order to enhance the operational reliability of a brake system with electronic brake force distribution control. To this end, German Patent Application No. 42 24 971 teaches producing a short pressure reduction pulse during a braking operation, which pulse is negligible with respect to the braking effect, and evaluating the reaction of the front wheel to this pressure reduction pulse.

SUMMARY OF THE INVENTION

All known provisions permit only the detection of defined errors and reducing their effect on the driving safety. However, the objective of the present invention includes achieving a safety concept for a brake system with electronic brake force distribution control and ABS/TCS control which ensures the driving stability and the functioning of the brakes upon the occurrence of defects or malfunctions, on the one hand, yet impairs the control only to the extent necessary in view of the error occurred, on the other hand.

Accordingly, the special features of the above-mentioned circuit include a plurality of measures. Upon failure of a sensor, which may be due to a short-circuit or a line interruption, or the presence of an incorrect sensor signal, which may be identified, for example, by comparison of several sensor signals and by plausibility checks, the vehicle reference speed is produced on the basis of the intact sensors. Also, an electronic brake force distribution control function is still possible, however, an ABS or TCS function is limited or prevented. When the defective sensor is a rear-wheel sensor, the rear wheels will be controlled synchronously. When the supply voltage drops below a predetermined limit value (as long as the supply voltage is still in excess of a predetermined, second, lower limit value), an electronic brake force distribution control function is still possible, but an ABS/TCS function is limited or prevented.

According to one aspect of the present invention, one sensor failure per axle is permitted. An electronic brake force distribution control function is still possible on the basis of one intact sensor per axle.

When the brake system is equipped with a pump system for the auxiliary pressure supply or for the return of pressure fluid which was discharged from the wheel brakes in the periods of braking pressure reduction, appropriately, the electronic brake force distribution control function is still possible when a defect of the pump system occurs, but an ABS/TCS function is limited or prevented.

Thus, the combination of the above-mentioned measures permits, to the extent possible, maintaining the electronic control of the brake force distribution even if defects or malfunctions occur. It is thereby ensured that the driver can govern the vehicle even in this situation. The error is indicated. For example, the disconnection of the ABS/TCS function may be indicated to the driver by the lighting of a warning lamp, and disconnection of the entire control, including the electronic brake force distribution control, is indicated by the additional lighting of a second warning lamp. Upon termination of the braking operation and, thus, in an uncritical situation, the driver may then acclimate to the characteristics of the brake force distribution which is changed due to the disconnection of the control. It is also possible to maintain the electronic brake force distribution control function in the extent limited due to the error after a warning signal has been issued. In general, the driving stability and the operation of the brakes is still more favorable than without the use of the control.

In a preferred aspect of the circuit according to the present invention, the electronic brake force distribution control function is still possible, however, an ABS/TCS-function is prevented, upon the occurrence of a defect which prevents the operation of one or a plurality of the front-wheel hydraulic valves or the operation of a rear wheel inlet valve. When a defect occurs which prevents the operation of a rear-wheel outlet valve, the electronic brake force distribution control function is maintained, and the inlet valve of the wheel having the defective outlet valve is switched over to close in order to avoid an excessive pressure increase on the rear axle.

Upon failure or malfunction of a front-wheel sensor, control of the front-wheel braking pressure in the ABS or TCS-mode is principally prevented.

Further details of the present invention are explained in the following description with reference to the accompanying drawings.

DETAILED DESCRIPTION OF THE INVENTION

Figure 1:
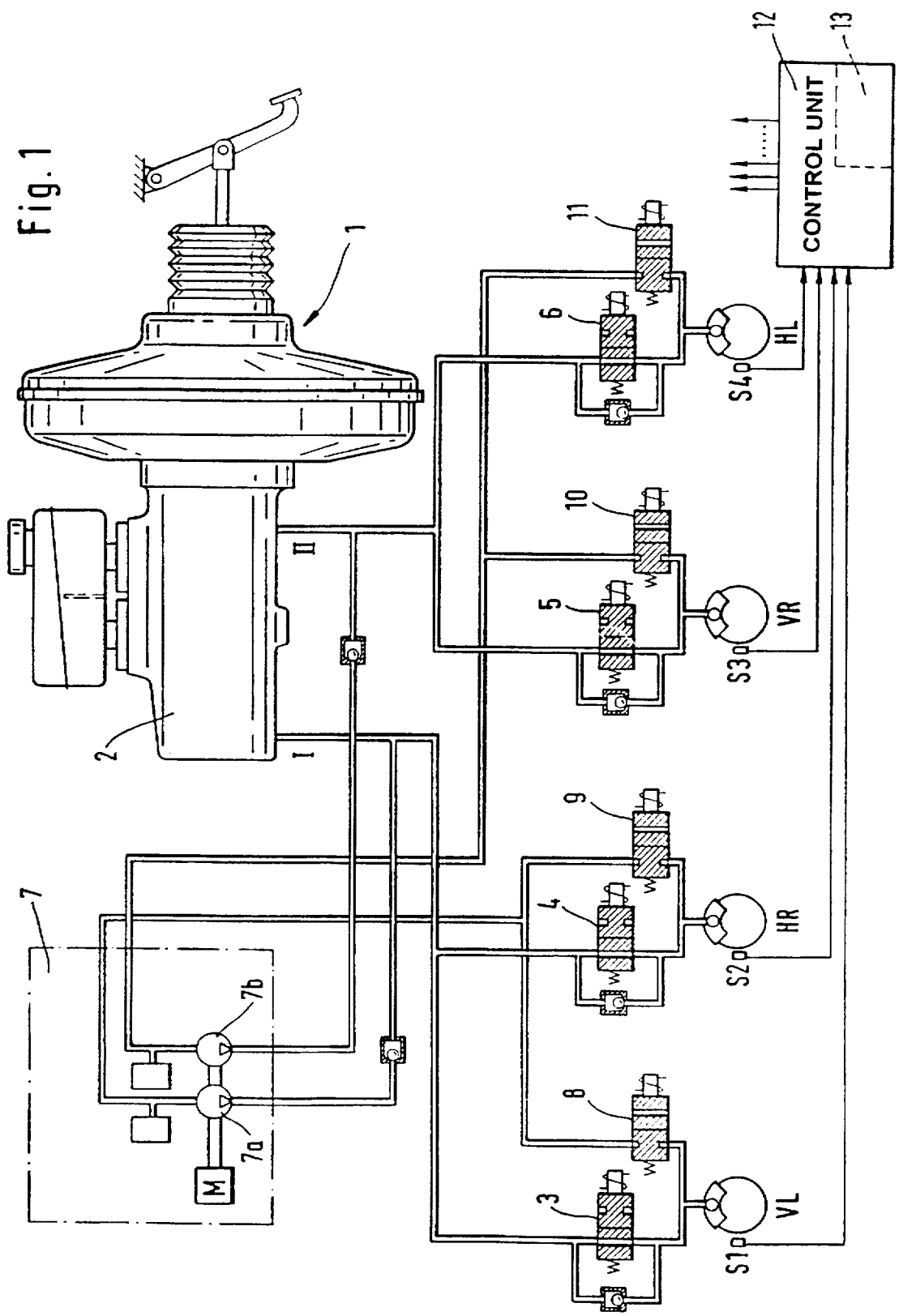
FIG. 1 is a simplified schematic diagram of the essential components of a brake system, constructed in accordance with the present invention, including electronic brake force distribution control and anti-lock control.

The brake system of FIG. 1 includes a braking pressure generator 1 having a tandem master cylinder 2. The wheel brakes are connected to master cylinder 2 by way of two hydraulically isolated brake circuits I, II. The brake system in the embodiment shown has a diagonal brake circuit allotment. Brake circuit I leads to the left front wheel VL and the right rear wheel HR, and brake circuit II leads to the other two wheels VR, HL. Of course, the present invention may also be realized in any other type of brake circuit split-up.

One electrically operable inlet valve 3, 4, 5, and 6, which is open in its inactive position, is inserted in each of the pressure fluid conduits which extend from the master cylinder 2 to the individual wheel brakes of wheels VL, HR, VR, HL. Outlet valves 8, 9, 10, and 11, which are closed in their inactive position and are also operable electrically, are inserted into the return lines connecting the wheel brakes of the individual wheels to a hydraulic pump system 7. The inlet valves 3, 4, 5, and 6 as well as the outlet valves 8, 9, 10, and 11 are two-way/two-position directional control valves which, when actuated, adopt their second switch position. In the second switch position, the inlet valves close the flow passage, while the outlet valves permit the discharge of pressure fluid from the respective wheel brake to the suction side of pump 7a or 7b of the pump system 7.

Only the hydraulic valves 4, 9; 6, 11 associated with the rear-wheel brakes are required for the electronic control of the brake force distribution. In comparison thereto, all inlet and outlet valves 3, 4, 5, and 6 and 8, 9, 10, and 11 are required for anti-lock control.

Each vehicle wheel VL, HR, VR, HL has a wheel sensor S1 to S4. The output signals of the sensors are evaluated in a control unit 12 which includes electronic circuits for the brake force distribution control and for anti-lock control. The control unit 12 also has circuits for monitoring the brake system and for switching the control over (to a different control pattern or for the partial or complete disconnection of the control in response to the respective malfunction). The monitoring circuits are represented by section 13 in the control unit 12, marked in dotted lines.

Figure 2:
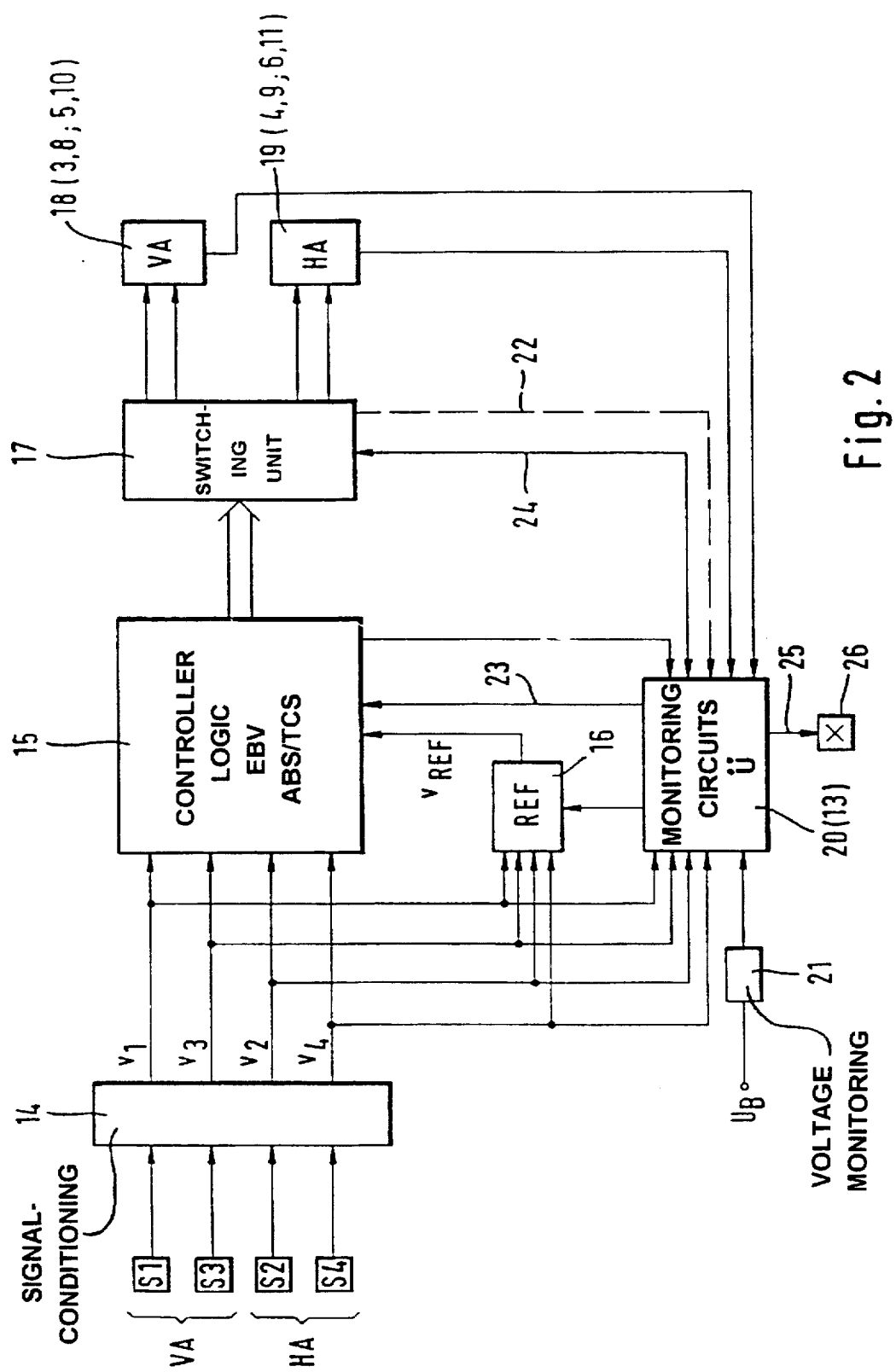
FIG. 2 is a block diagram showing the essential electronic components of a circuit of the present invention intended for use in the brake system of FIG. 1.

The circuit of FIG. 2 includes a signal-conditioning circuit 14 in which the signals produced by wheel sensors S1 to S4 are conditioned. Sensors S1 and S3 are arranged on the wheels of the front axle VA, and sensors S2 and S4 are arranged on the wheels of the rear axle HA.

The conditioned sensor signals are processed in a controller logic 15 which may include one or a plurality of microcomputers or microcontrollers to evaluate the input signals. A signal in approximation of the vehicle speed, namely the vehicle reference speed $v_{REF}$, is supplied to the controller logic 15, apart from the signals $v_1$ to $v_4$ representative of the conditioned speed signals of the individual wheels. The reference signal $v_{REF}$ is produced in a known manner by logically combining and evaluating the individual wheel speed signals $v_1$ to $v_4$ by way of a switching unit 16.

The signals for the braking pressure control or for the operation of the hydraulic valves 3, 4, 5, and 6 and 8, 9, 10, and 11, the hydraulic pumps 7, etc., are generated in the controller logic 15 according to predetermined algorithms. The electronic control of the brake force distribution (EBV) and the anti-lock control and/or traction slip control (ABS and/or TCS) is performed by way of these signals.

A switching unit 17 represents the valve actuation control wherein the output signals of the controller logic 15 are converted into valve control signals. The hydraulic valves, combined to form a unit 18, which are used to control the braking pressure in the wheel brakes of the front axle VA are connected to the outlets of the valve actuation unit 17. Reference numeral 19 represents the hydraulic valves of the rear axle HA. In the embodiment of FIG. 1, the inlet/outlet valve pairs 3, 8; 5, 10 are associated with the front axle (18), and the valve pairs 4, 9; 6, 11 are associated with the rear axle (19).

Reference numeral 20 in FIG. 2 designates the entirety of the monitoring circuits corresponding to the monitoring section 13 in FIG. 1. As input signals, the conditioned speed signals $v_1$ to $v_4$ produced by the sensors S1 to S4 are conducted to the monitoring section. Further, a voltage monitoring means 21 which monitors the battery voltage $U_B$ of the vehicle to check whether predetermined limit values are adhered to, leads to the monitoring circuit 20.

The switch condition of the hydraulic valves is also indicated to the monitoring circuits 20. Indications about existing defects or malfunctions of the sensors, the instantaneous coefficient of friction, the condition of the energy supply and the instantaneous control situation or driving situation are produced and evaluated in the monitoring circuit 20 by comparison of the switch condition and by logical combining with the speed signals and/or with data furnished by the controller logic 15.

Further, a signal line 22 which leads from the valve switching unit 17 to the monitoring circuit 20 is shown in dotted lines in FIG. 2. In one embodiment of the present invention, data are conducted to the monitoring circuit 20 by way of line 22 which permit concluding defects or malfunctions from a comparison with valve actuation signals, for example.

When a defect or a malfunction is detected, the monitoring circuits 20 will intervene in the previously described manner with the electronic brake force distribution control and/or ABS/TCS control and/or with the valve actuation unit 17. Signal lines 23, 24 are provided for this purpose. Another signal line 25, which leads to a warning lamp 26 in this arrangement, is used as an optical or acoustical indication of an error condition.

Principally, it is also possible, after the detection of a defect or a malfunction, to intervene with the sequence of control in any other fashion, for example, by directly actuating the hydraulic valves 18, 19.

The switch functions explained with respect to FIG. 2 are appropriately realized by a corresponding programming of a microcomputer which processes and evaluates the data and performs the electronic brake force distribution control and the ABS/TCS control.

We claim:

1. A brake system for a vehicle comprising:
   a plurality of wheel sensors individually associated with front wheels and rear wheels of the vehicle for determining the rotational behavior of the individual wheels;
   a plurality of wheel brakes individually associated with the front wheels and the rear wheels of the vehicle;
   a plurality of valves for controlling pressure fluid flow to and from said wheel brakes;
   means for evaluating determinations of the rotational behavior of the individual wheels to determine a vehicle reference speed and to generate braking pressure controls for said valves;
   at least one of:
   (a) an anti-lock control system, and
   (b) a traction slip control system;
   means for controlling distribution of pressure fluid flow to said wheel brakes;
   means for monitoring the brake system and:
   (a) for at least partially disconnecting control of the brake system in response to at least one of:
      (1) defects and malfunctions, and
      (2) control and driving situations, and
   (b) upon at least one of:
      (1) failure of a wheel sensor, and
      (2) presence of an incorrect wheel sensor determination:
         (i) the vehicle reference speed determination is based on the rotational behavior determinations of those wheel sensors which are intact, and
         (ii) both wheel brakes associated with the rear wheels are controlled synchronously when a wheel sensor associated with a rear wheel is defective,
   for controlling distribution of pressure fluid flow to said wheel brakes while at least limiting at least one of anti-lock control and traction slip control, and
   (c) when a supply voltage drops below a first predetermined limit value, but remains in excess of a second predetermined lower limit value, for controlling distribution of pressure fluid flow to said wheel brakes while at least limiting at least one of anti-lock control and traction slip control.

2. A brake system according to claim 1 further including a pump system for auxiliary pressure supply and return of pressure fluid and said brake system monitoring means control distribution of pressure fluid flow to said wheel brakes while at least limiting at least one of anti-lock control and traction slip control when a defect or malfunction of said pump system occurs.

3. A brake system according to claim 1 wherein said brake system monitoring means control distribution of pressure fluid flow to said wheel brakes while at least limiting at least one of anti-lock control and traction slip control upon the occurrence of a defect which prevents operation of one of said front-wheel hydraulic valves.

4. A brake system according to claim 1 wherein each of said rear-wheel brakes has associated with it an inlet valve and an outlet valve and said brake system monitoring means control distribution of pressure fluid flow to said wheel brakes while preventing at least one of anti-lock control and traction slip control upon the occurrence of a defect which prevents the operation of a rear-wheel inlet valve.

5. A brake system according to claim 1 wherein each of said rear-wheel brakes has associated with it an inlet valve and an outlet valve and when a defect occurs which prevents the operation of a rear-wheel outlet valve, the pressure fluid flow distribution to said wheel brakes is maintained and the inlet valve associated with the wheel with which the defective outlet valve is associated is switched over to close.

6. A brake system according to claim 1 wherein control of the braking pressure of the front wheel brakes in the anti-lock control and traction slip control is prevented upon failure or malfunction of a front-wheel sensor.

7. A brake system according to claim 1 further including alarm means for separately alerting a driver of the vehicle of the occurrence of a defect causing limitation or prevention of anti-lock control and traction slip control and the occurrence of a defect causing prevention of pressure fluid distribution to said wheel brakes.

8. A brake system according to claim 7 wherein said alarm means include a first warning lamp which indicates the occurrence of a defect causing limitation or prevention of anti-lock control and traction slip control and a second warning lamp which indicates prevention of anti-lock control, traction slip control, and pressure fluid distribution.

9. A brake system for a vehicle comprising:
   a plurality of wheel sensors individually associated with front wheels and rear wheels of the vehicle for determining the rotational behavior of the individual wheels;
   a plurality of wheel brakes individually associated with the front wheels and the rear wheels of the vehicle;
   a plurality of valves for controlling pressure fluid flow to and from said wheel brakes;
   means for evaluating determinations of the rotational behavior of the individual wheels to determine a vehicle reference speed and to generate braking pressure controls for said valves;

at least one of:
(a) an anti-lock control system, and
(b) a traction slip control system;

means for controlling distribution of pressure fluid flow to said wheel brakes;

means for monitoring the brake system and:
(a) for at least partially disconnecting control of the brake system in response to at least one of:
(1) defects and malfunctions, and
(2) control and driving situations, and
(b) upon at least one of:
(1) failure of any of said front-wheel sensors and any of said rear-wheel sensors, and
(2) presence of an incorrect wheel sensor determination from any of said front-wheel sensors and any of said rear-wheel sensors:
(i) the vehicle reference speed determination is based on the rotational behavior determinations of those wheel sensors which are intact, and
(ii) both wheel brakes associated with the rear wheels are controlled synchronously when a wheel sensor associated with a rear wheel is defective, for controlling distribution of pressure fluid flow to said wheel brakes while at least limiting at least one of anti-lock control and traction slip control, and (c) when a supply voltage drops below a first predetermined limit value, but remains in excess of a second predetermined lower limit value, for controlling distribution of pressure fluid flow to said wheel brakes while at least limiting at least one of anti-lock control and traction slip control.

* * * * *